Jan. 3, 1956 R. G. LE TOURNEAU 2,729,298
WHEEL MOUNTED MOTOR AND AIR-OPERATED CLUTCH
WITH ELECTRICAL CONTROL THEREFOR
Original Filed Sept. 11, 1950 3 Sheets-Sheet 3
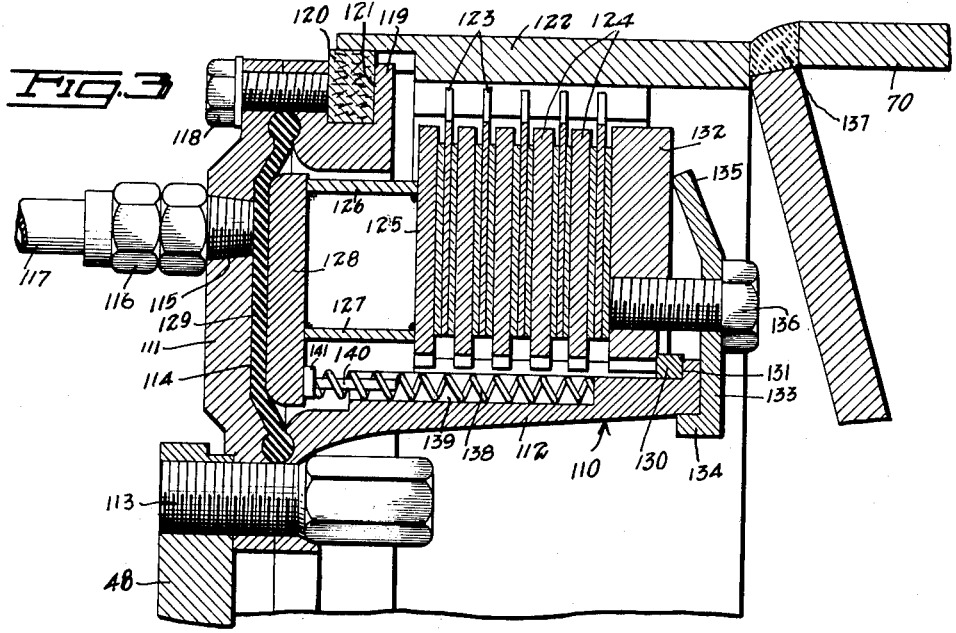
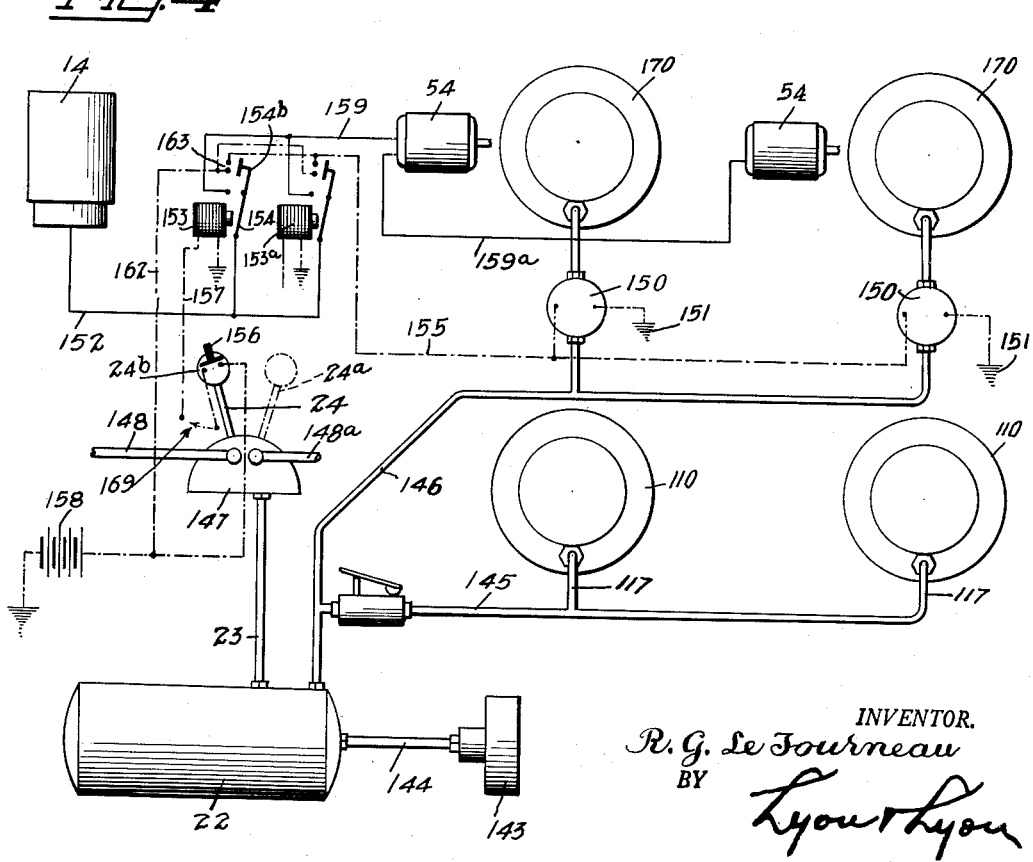
INVENTOR.
R. G. Le Tourneau
BY
Lyon & Lyon
Attorneys

United States Patent Office 2,729,298
Patented Jan. 3, 1956

2,729,298

WHEEL MOUNTED MOTOR AND AIR-OPERATED CLUTCH WITH ELECTRICAL CONTROL THEREFOR

Robert G. Le Tourneau, Longview, Tex., assignor to R. G. Le Tourneau, Inc., Peoria, Ill., a corporation of California Original application September 11, 1950, Serial No. 184,226. Divided and this application November 24, 1951, Serial No. 258,063

7 Claims. (Cl. 180—60)

This application is a division of a copending application, Serial No. 184,226, entitled "Electric Booster Wheel and Control," filed September 11, 1950.

This invention relates to vehicles having a front wheel drive and has for its primary object the provision of a power drive for the rear wheels independent of said front wheel drive.

The invention in its present embodiment is disclosed in connection with heavy duty earth moving equipment, such as a carrier scraper.

In the operation of such carrier scraper, it is common practice to have a standby separate bulldozer or pusher on the job to assist in loading the carrier scrapers. This bulldozer commonly is used to push against the push bar of the scraper to provide additional power at the right time and permit a full capacity load to be picked up on each trip. This of course requires not only an extra machine but an extra operator.

It is accordingly one object of this invention to provide a self-contained vehicle in which provision is made for the application of power to the rear wheels when additional drive is required, thus eliminating the necessity for such a separate bulldozer or pusher.

It is a feature of this invention that an electric motor is provided driving the wheels through an electrically controlled air operated clutch, so arranged that the same switch which starts the electric motor will simultaneously open a solenoid valve to release air to operate the clutch. Novel means is provided to assure that the motor will be in operation when the clutch is engaged.

It is a further feature of this invention that an electric motor driven wheel is provided having a stationary hollow axle about which the rim portion revolves and the combined power and control means extends through and is journaled within the axle.

These and other objects, features and advantages will be apparent from the annexed specification in which:

Figure 3 is an enlarged fragmentary section similar to Figure 2 taken through the brake mechanism of one of the wheels.

Figure 4 is a schematic representation of the electric and air controls.

Figure 5 is a sectional view of the solenoid operated air valve employed in this invention.

Figure 1:
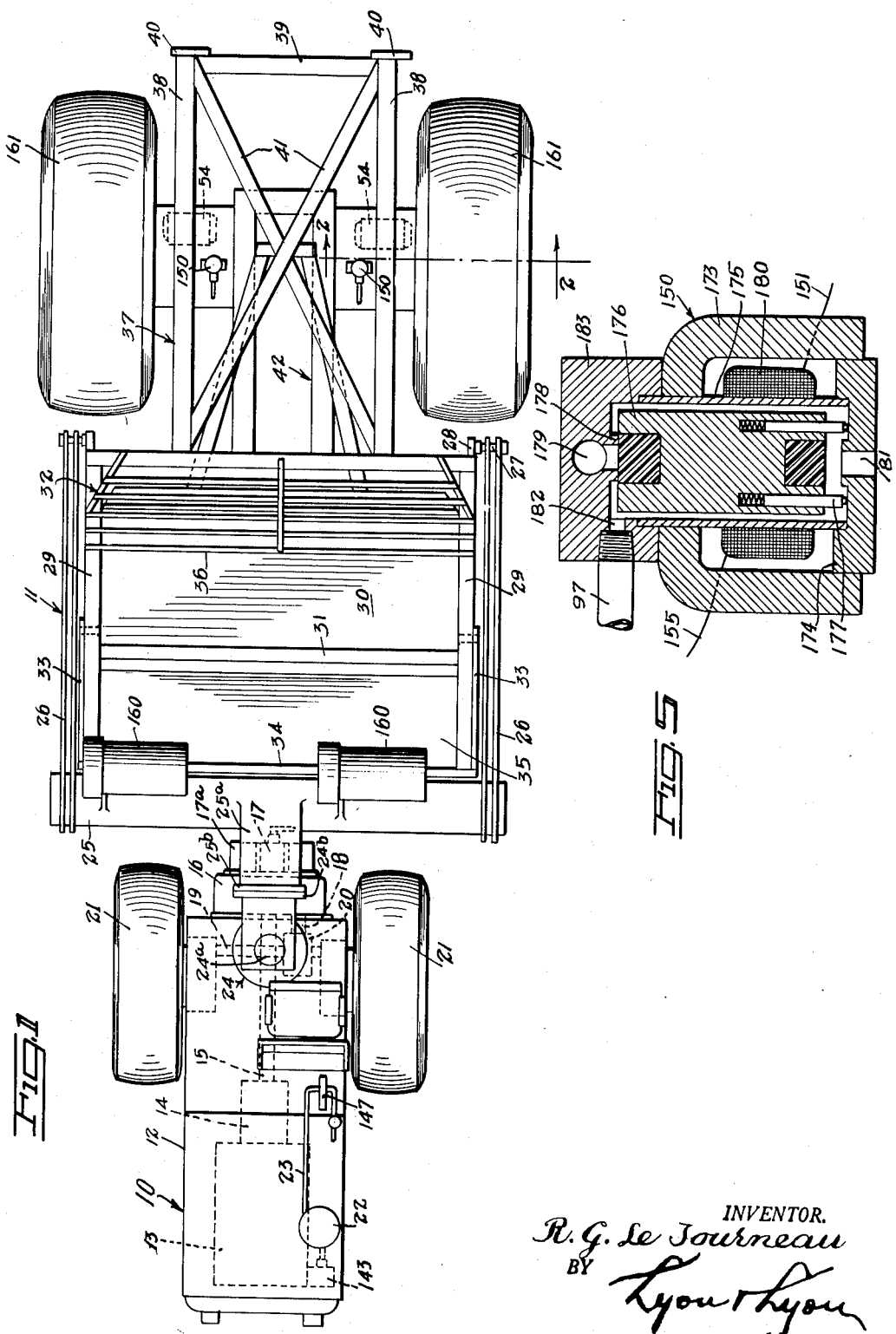
Figure 1 is a plan view partly schematic of a carrier scraper embodying the present invention.

Referring more particularly to the drawings and particularly to Figure 1, there is illustrated the invention as embodied in a carrier scraper. This carrier scraper includes a tractor unit designated generally by the numeral 10 and a scraper unit designated generally by the numeral 11. The tractor unit includes a frame 12, an engine 13 driving an in-line generator 14 and a driven shaft 15 leading to a transmission 16.

The transmission is preferably of a constant mesh type shown in my copending application Serial No. 735,484, filed March 18, 1947, now Patent No. 2,553,376. This transmission is controlled by air operated clutches 17 as hereinafter described. The transmission includes an output shaft 18 which drives the cross shaft 19 through a suitable differential 20, which cross shaft 19 includes pinions (not shown) operative to drive the tractor wheels 21.

An air cylinder 22 receiving compressed air from a compressor 143 operated by power from the engine 13 is provided on the tractor 10 and a conduit 23 communicates the air cylinder 22 with the control valve 147. The scraper unit 11 is preferably of the type shown in my Patent No. 2,495,336, granted January 24, 1950, though any other well known carrier scrapers may be substituted. The details of construction of the carrier scraper are not important to the present invention except it is preferable that the operating units all employ A. C. electric motors as do the rear wheels of this invention, which fact will simplify maintenance.

The scraper depicted includes a U-shaped yoke member 25 having longitudinally extending beams 26. The beams 26 are pivotally connected as at 27 to extensions 28 of a frame 29. The frame 29 includes a pan 30 to which is attached a blade 31 and a rear end gate 32 which is movable forward in the frame by suitable means (not shown) for rejecting the load. Pivoted from the body member 29 is a pair of arms 33 connected together by a cross beam 34 which supports a front apron 35 in the well known manner. The front apron 35 is also adjustable by means of electric motor 160 to raise and lower the apron when desired.

The tractor 10 and scraper 11 are connected through an electric power steering hitch 24 which forms no part of the present invention but for the details of construction reference may be had to my Patent No. 2,400,868, granted May 28, 1946. A forwardly extending neck 25a of the scraper yoke 25 includes a bolt flange 25b which attaches directly to a corresponding bolt flange 24b of hitch 24. A vertical kingpin 24a is included in steering hitch 24 so that a pivot is provided for relative turning between the tractor unit 10 and the scraper 11.

A protective open framework 36 may be provided over the rear of the framework 29 to assist in retaining the load.

At the rear of the frame 29 there is provided a rearwardly extending framework designated generally at 37 and including longitudinal beams 38 between which there extends a push beam 39, including push pads 40, cross braces 41 and auxiliary framework 42.

The push beam 39 and pads 40 in structures of this type are normally engaged by the auxiliary bulldozer or pusher, which it is one object of this invention to eliminate. However, in certain situations, even the auxiliary power which this invention provides for the rear wheels may be insufficient to permit full and rapid loading of the scraper and, hence, the retention of the push beam 39 and pads 40 is desirable. Furthermore, the push beam 39 acts as a bumper and also reinforces the frame 38.

Figure 2:
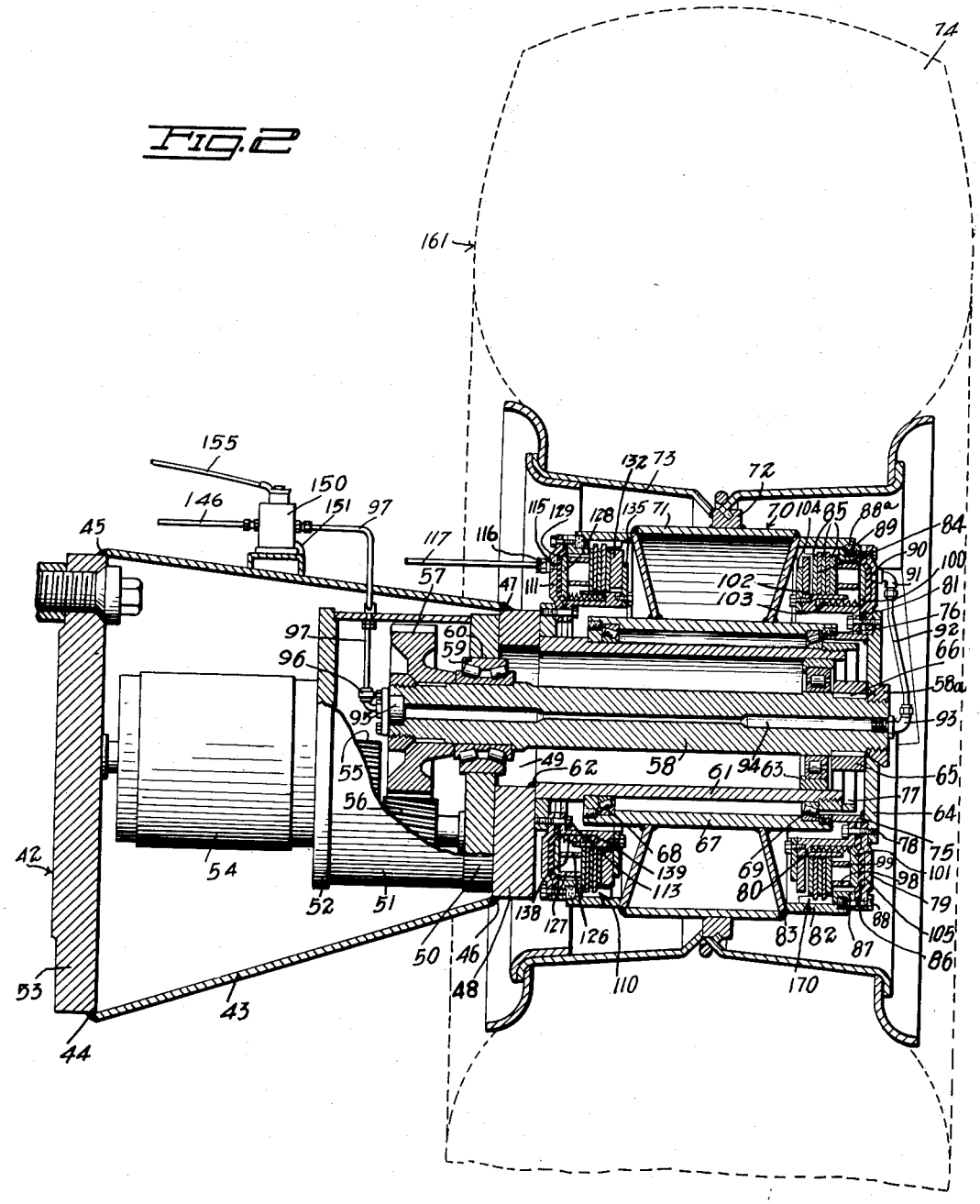
Figure 2 is an enlarged section taken along the line 2—2 of Figure 1.

Referring more particularly to Figure 2, there is shown mounted upon the side of the auxiliary frame 42 a housing 43 welded to the frame 42 as at 44 and 45. The outer end of the housing 43 is welded as at 46 and 47 to a plate 48. The plate 48 is apertured as at 49. Mounted upon the plate 48 is a plate 50 forming one wall of a gear box 51 and mounted between the rear wall 52 of the gear box 51 and the side plate 53 of the frame 42 is a single speed reversible A. C. electric motor 54. The electric motor 54 is operably connected to a reduction gearing system, indicated generally by the numeral 55, which is operably connected to a pinion 56 meshing with a gear 57 carried by the shaft 58. The shaft 58 is journaled in a roller bearing 59 mounted in an aperture 60 in the plate 50 and extends centrally of the stationary axle 61, which axle 61 is welded as at 62 to the plate 48 aligning with the aperture 49 therein. The stationary axle supports a roller bearing 63 in which the other end of the shaft 58 is journaled. The shaft 58 is in the form of a hollow spindle and a clutch supporting plate 64 is provided having a hub 65 which is spline connected to the shaft 58 as at 66. The shaft 58 is threaded at its outer end to receive the retaining nut 58a.

A ring 67 is provided surrounding the stationary axle 61 and journaled on this axle by oppositely tapered bearings 68 and 69. A wheel body 70 is welded to the ring 67, the ring member 71 of which has welded thereto a ring 72 to which there is welded a rim section 73 of a wheel. This wheel is built in accordance with the disclosure of Patent No. 2,466,449, issued April 5, 1949, reference to which is made for the details which form no part of the present invention. A pneumatic tire 74 is mounted upon the wheel as indicated. The plate 64 has welded thereto a cylindrical shell 75 adapted to overlie and to prevent, together with sealing ring 76 carried by the ring 67, the introduction of foreign matter into the bearing 69 which is retained by bearing ring 77.

The plate 64 has mounted thereon, as by means of the circumferential row of studs 78, a clutch and ring 79. The clutch unit indicated generally as 170 is built in accordance with my Patent No. 2,453,237, issued November 9, 1948, and includes an inner drum 80 having a flange 81 clamped to the plate 64 by the studs 78 and an outer drum 82 welded to the wheel body 70 as at 83. The outer drum 82 has affixed thereto, by multiple splines, the clutch plates 84 and the inner drum 80 has affixed thereto, by multiple splines, the clutch plates 85. The end ring 79 is formed with a relatively shallow angular channel 105 and a flexible annular diaphragm 86 of material such as fabric reinforced "neoprene" is seated in said channel and retained therein by having its inner circumference clamped between the flange 81 and the end ring 74 by the studs 78, and having its outer circumference clamped between the outer end of the ring 79 and a bolt ring 87 by means of the studs 88. The belt ring 87 is provided with an annular channel 88a in which is seated a felt pad 89. The end ring 79 is tapped as at 90 in a fitting 91 secured therein communicating with a conduit 92 which is itself affixed by a fitting 93 to the end of the shaft 58 centrally thereof and in communication with a bore 94 in said shaft. The other end of the shaft 58 is provided with a swivel joint 95 and a fitting 96 to which is connected a conduit 97. The outermost plate 85 has welded thereto a pair of concentric rings 98 and 99 to the outer edges of which a pressure plate 100 is welded. The plate 100 has an enlarged head 101 adapted to conform to the shape of the channel 105.

The inner plate or hub 80 is provided with an annular recess 102 in which is seated a plurality of coil springs 103, and a ring guard 104 is bolted to the inside of the hub 80 to complete the clutch assembly.

From the foregoing, it will be apparent that the clutch is disengaged normally by the force of the springs 103 but will be engaged by the application of fluid pressure through the conduit 97, bore 94, conduit 92, fitting 91 and between the diaphragm 86 and end ring 79.

Each wheel is also provided with a brake 110 generally similar to the clutch unit 170 just described and shown in detail in Figure 3. It is there indicated the end ring 111 and the inner hub 112 are secured to the plate 48 by the studs 113. The end ring 111 has a channel 114 therein and is tapped as at 115 to receive a fitting 116 to which is connected a conduit 117. The end ring 111 is also secured by studs 118 to a bolt ring 119. The studs 118 engage a felt pad 120 seated in an annular recess 121 in the bolt ring 119.

An outer drum 122 is provided to which there is secured by a plurality of splines, a plurality of plates 123. The hub 112 is also secured thereto by a plurality of splines, a plurality of plates 124 and the outermost plate 125 has welded thereto the rings 126 and 127 which are in turn welded to pressure plate 128. A diaphragm 129, similar to the diaphragm 86, is mounted between the end ring 111 and the plate 128 as shown. A retaining ring 130 is provided engaging a shoulder 131 formed on the inner edge of the hub 112 and the ring 130 engages an end plate 132 splined upon the hub. A ring guard 133 having a flange 134 and an outwardly extending portion 135 adapted to engage the plate 132 is secured to the plate 132 by means of studs 136. The outer drum 122 is welded to the wheel body 70 as at 137. The hub 112 is provided with a plurality of coil springs 138 seated in an annular recess 139 and a corresponding plurality of pins 140 is engaged by the coil springs 138 which force the heads 141 of the pins against the plate 128.

In the foregoing description it will be apparent that the brake 110 is normally held disengaged under the force of the springs 138 but is adapted to be engaged on the application of fluid under pressure through conduit 117 into the space between the diaphragm 129 and the end ring 111.

Referring more particularly to Figure 4, there is shown a schematic arrangement of the electric and hydraulic controls for operating the above-described mechanism.

The compressor 143 driven by the engine 13 in any suitable manner delivers compressed air through the conduit 144 to the air cylinder 22. The air cylinder 22 is connected by the conduit 23 to a control valve 147 operated by the handle 24. From the valve 147 a conduit 148 is provided applying pressure to the clutch 17 as fully set forth in my copending application entitled "Fluid Pressure Control Valve," Serial No. 768,782, filed August 15, 1947, and now abandoned, and in previously mentioned application Serial No. 735,484, now Patent No. 2,553,376.

Conduit 146 is provided branched at 145 and a treadle valve 149 is interposed in the branch 145, which branch communicates with the conduits 117 leading to the brakes. The other branch 146 communicates with the solenoid valves 150.

The solenoid valves 150 may be any suitable type of solenoid valve, however I prefer to use an improved type solenoid valve as shown and described in my copending application Serial No. 140,092, filed January 23, 1950, and has become Patent No. 2,686,535 on August 17, 1954. In Figure 5 details of the electrically operated air control valve 150 may be observed. A magnetic material body 173 including bottom plate 174 encloses a brass sleeve 175 in which a magnetic plunger 176 may operate. Spring loaded pins 177 keep plunger 176 normally pressed against the air supply valve seat 178 to prevent the air from intake port 179 from entering the valve. When windings 180 surrounding sleeve 175 are excited by current through lead 155 the plunger 176 is magnetically pulled toward bottom plate 174 and thereby closes off exhaust port 181 and opens valve seat 178 so that there is a clear passage from the air intake port 179 to clutch the port 182 and pressurized air is then directed through conduit 97, fitting 96 and on to the clutch 170. Head 183 of this valve is nonmagnetic so there is no magnetic action between it and the plunger 176. Due to the location of this valve 150 at a point adjacent the booster drive unit there will be no appreciable delay in the response of clutches 170 to switch 156. Since air under pressure occupies the line 146, the tractor clutches 17 and rear wheel clutches 170 may be made to engage at virtually the same time provided switch 156 is depressed at the same instant handle 24 is moved to its speed position. However air itself will not respond as quickly as electricity so that in the time it takes air to move from the valve 150 to the clutch 170 the motor 54 will have attained operating speed.

In Figure 4 a schematic explanation of the cooperating air and electrical circuits employed in this invention may be observed. Since the invention here is employed for two separate speeds of operation, one corresponding to the low forward speed of the engine and the other corresponding to low reverse, and since they are virtually identical in operation the description here will cover the low forward speed with only occasional reference to the other speed.

The alternating current originating at the generator 14 which is directly driven by the tractor engine 13 is directed through three-phase lead 152 (shown solid on the drawing) to the input side represented by the arm 154 of the relay 153. Control handle 24 of the transmission control valve 147 is moved to the low forward position (shown solid) and at this position air is directed from the tank 22 through the conduit 23 through the selected internal passage of valve 147 and out by way of conduit 148 to the proper air clutch 17 to engage the low forward speed of the transmission 16. At this point of control handle 24, if it is desired to engage the auxiliary rear wheel drive, a push button switch 156 in the head 24b of the handle 24 may be depressed, which will close the direct current control circuit 157 (shown by broken lines) from the battery 158 to the relay 153, which relay is operated by the excitation of direct current. However, it will be noted that circuit 157 will not be closed unless a limit switch 169 at the lower part of handle 24 is first tripped. This limit switch 169 is only tripped when the handle 24 is engaging the low forward (or low reverse) speed of the transmission 16. At all other speeds this limit switch remains open so that it is impossible to engage the auxiliary drive at any transmission speed except those for which it is synchronized. With circuit 157 closed the relay 153 will close to communicate the A. C. power to motors 54 through the three-phase leads 159 and 159a to rotate gearing 55 and shaft 58 and the clutch plate 64 (Figure 2) preparatory to driving the rear wheels 161. At the same instant that this A. C. circuit is being put into operation, the D. C. circuit for operating the solenoid valves 150 is being activated. A lead 162 (shown by broken lines) from battery 158 connects to the input side of a small switch 163 adjacent the relay 153. An extension 154b on the arm 154 will operate to close the switch 163 at the same time and from the same power that the arm 154 closes the relay 153. The direct current circuit to solenoid valve 150 is then completed through the lead 155, and grounded thereafter at 151.

Relay 153a may be activated to operate the motors 54 in reverse which will produce a speed and movement of the rear wheels to correspond to low reverse speed of the transmission. The control handle represented in dotted lines is identified by reference numerals 24a to signify this low reverse position. In this position corresponding elements such as the limit switch 169, D. C. switch 163, etc., will be present in the same arrangement as described for the low forward speed, including a separate conduit 148a and a separate clutch unit 17a for the reverse speed of the tractor.

It will be observed that the clutch unit 170 and the brake unit 110 are interchangeable as units and many of the parts are interchangeable, which practice will lend itself to simplified maintenance and economy of replacement parts, as well as utilization of a single power source.

The low forward and low reverse speeds of the vehicle are the only ones that employ the rear wheel booster drive since these are the vehicle speeds with the greatest power and if their power is not sufficient for the job at hand, it is then the booster drive is called into action. In order to synchronize the front and rear wheels when all four are driving, it is necessary that their speeds be identical or nearly so. To do this the speed of the electric motors 54 and the ratios of the reduction gears 55 and the size of the tires 74 must be selected so the road speed of the tires 74 and wheels 161 will approximate that of the wheels 21.

While there has been described what is at present considered a preferred embodiment of the present invention, it will be appreciated by those skilled in the art that various changes and modifications can be made therein without departing from the essence of the invention and it is intended to cover herein all such changes and modifications as come within the true spirit and scope of the appended claims.

What is claimed is:

1. A wheel drive unit for vehicles, comprising: a gear box supported from the vehicle by a frame, an electric motor attached to and driving said gear box, a stationary hollow axle projecting laterally from said frame, a wheel journaled about said axle, a spindle extending through said axle and one end of said spindle engaging said gear box in driven relation, a clutch support attached to the other end of said spindle and driven therewith, an air clutch between said wheel and clutch support to impart rotation to the wheel when said air clutch is engaged, a solenoid air valve near said frame and dual function electric control means to permit simultaneous excitation of said valve and motor.

2. A wheel drive unit for vehicles, comprising: an electric motor driven gear box supported from the vehicle by a frame, an electric motor for driving said gear box, a stationary hollow axle projecting laterally from said frame, a wheel journaled about said axle, a spindle extending through said axle and one end of said spindle engaging said gear box in driven relation, a clutch support attached to the other end of said spindle and driven therewith, an air clutch between said wheel and clutch support to impart rotation to the wheel when said air clutch is engaged, a solenoid air valve near said frame, dual function electric control means to permit simultaneous excitation of said valve and motor, an external air supply line connecting said valve with an air source and the distance between said valve and said clutch being sufficient to delay engagement of said clutch until said motor is operating full speed from said excitation.

3. A wheel drive unit for vehicles, comprising: a gear box supported from the vehicle by a frame, an electric motor attached to and driving said gear box, a stationary hollow axle projecting laterally from said frame, a wheel journaled about said axle, a spindle extending through said axle and one end of said spindle engaging said gear box in driven relation, a clutch support attached to the other end of said spindle and driven therewith, an air clutch between said wheel and clutch support to impart rotation to the wheel when said air clutch is engaged, a solenoid air valve near said frame, dual function electric control means to permit simultaneous excitation of said valve and motor, and said solenoid valve including means therein to exhaust the air from said clutch upon cessation of the electric supply current to permit free wheeling between the motor and the wheel.

4. A wheel drive unit for vehicles, comprising: an electric motor driven gear box supported from the vehicle by a frame, an electric motor for driving said gear box, a stationary hollow axle projecting laterally from said frame, a wheel journaled about said axle, a hollow spindle extending through said axle and one end of said spindle engaging said gear box in driven relation, a clutch support attached to the other end of said spindle and driven therewith, an air clutch between said wheel and clutch support to impart rotation to the wheel when said air clutch is engaged, an air line passing through said gear box and a fitting at said one end of the spindle, said fitting being journaled in said spindle, a second fitting rigidly attached to the said other end of the spindle and rotating therewith, an air line connecting said second fitting to said air clutch, a solenoid valve, an external air supply line connecting said valve with an air source, dual function electric control means to permit simultaneous excitation of said valve and motor, the distance between said valve and said clutch being sufficient to delay engagement of said clutch until said motor is operating full speed from said excitation and said solenoid valve including means therein to exhaust the air from said clutch upon cesesation of the electric supply current to permit free wheeling between the motor and the wheel.

5. A power drive wheel unit comprising: a wheel, an electric motor attached to and driving said wheel, a source of compressed air, an air operated clutch between said motor and said wheel, a solenoid air valve for admitting air from said source to engage said clutch, a source of electric power, and electric control means for delivering said electric power to said motor and to said valve.

6. A power drive wheel unit as set forth in claim 5, said electric control means comprising a relay for energizing said motor and said valve simultaneously.

7. A power drive wheel unit comprising: a wheel, an electric motor attached to and driving said wheel, a source of compressed air, an air operated clutch between said motor and said wheel, a solenoid air valve for admitting air from said source to engage said clutch, a source of electric power, a relay for energizing said motor and said valve simultaneously, the distance between said valve and said clutch being sufficient to delay engagement of said clutch until said motor is operating at full speed.

References Cited in the file of this patent

UNITED STATES PATENTS

| | | |
|---|---|---|
| 1,421,545 | Osborn | July 4, 1922 |
| 1,589,393 | Howe | June 22, 1926 |
| 1,598,904 | Zancan | Sept. 7, 1926 |
| 1,832,598 | Weber | Nov. 17, 1931 |
| 2,055,081 | Jacobs | Sept. 22, 1936 |
| 2,082,001 | Hanson | June 1, 1937 |
| 2,386,477 | Kraft | Oct. 9, 1945 |
| 2,386,478 | Kraft | Oct. 9, 1945 |
| 2,487,702 | Goodwillie et al. | Nov. 8, 1949 |

FOREIGN PATENTS

| | | |
|---|---|---|
| 331,624 | France | Mar. 7, 1903 |
| 766,753 | France | Apr. 23, 1934 |
| 9,259 | Great Britain | 1909 |